US008209638B2

(12) United States Patent
Hoff et al.

(10) Patent No.: US 8,209,638 B2
(45) Date of Patent: Jun. 26, 2012

(54) CUSTOMIZATION ABSTRACTION

(75) Inventors: Roland Hoff, Walldorf (DE); Marcus Behrens, Heidelberg (DE); Joachim Bugert, Speyer (DE); Karsten Hartmann, Angelbachtal (DE); Roland Keil, Ubstandt-Weiher (DE); Almer Podbleanin, Mannheim (DE); Andrens Schaefer, St. Leon-Rot (DE); Markus Wolf, Oftersheim (DE)

(73) Assignee: SAP AG, Walldorf (DE)

( * ) Notice: Subject to any disclaimer, the term of this patent is extended or adjusted under 35 U.S.C. 154(b) by 438 days.

(21) Appl. No.: 12/347,720

(22) Filed: Dec. 31, 2008

(65) Prior Publication Data
US 2010/0169844 A1  Jul. 1, 2010

(51) Int. Cl.
*G06F 3/00* (2006.01)
(52) U.S. Cl. ........ 715/866; 715/707; 715/745; 715/746; 715/735; 709/226; 709/219; 709/224
(58) Field of Classification Search .................... 715/866
See application file for complete search history.

(56) References Cited

U.S. PATENT DOCUMENTS

| | | | | | |
|---|---|---|---|---|---|
| 5,848,396 | A | * | 12/1998 | Gerace | 705/7.33 |
| 6,014,638 | A | * | 1/2000 | Burge et al. | 705/7.29 |
| 6,014,666 | A | * | 1/2000 | Helland et al. | 1/1 |
| 6,026,433 | A | * | 2/2000 | D'Arlach et al. | 709/217 |
| 6,121,968 | A | * | 9/2000 | Arcuri et al. | 715/825 |
| 6,357,040 | B1 | * | 3/2002 | Porter | 717/154 |
| 6,847,387 | B2 | * | 1/2005 | Roth | 715/811 |
| 6,934,915 | B2 | * | 8/2005 | Rudd et al. | 715/765 |
| 6,981,242 | B2 | * | 12/2005 | Lehmeier et al. | 717/122 |
| 7,124,192 | B2 | * | 10/2006 | High et al. | 709/229 |
| 7,219,101 | B2 | * | 5/2007 | Dorsey | 1/1 |
| 7,237,119 | B2 | * | 6/2007 | Clark et al. | 713/182 |
| 7,454,386 | B2 | | 11/2008 | Chakraborty | |
| 7,523,231 | B1 | * | 4/2009 | Gupta et al. | 710/36 |
| 7,620,894 | B1 | * | 11/2009 | Kahn | 715/707 |
| 7,631,362 | B2 | * | 12/2009 | Ramsey | 726/27 |
| 7,634,567 | B1 | * | 12/2009 | Wood et al. | 709/226 |
| 7,680,901 | B2 | * | 3/2010 | Rechterman et al. | 709/219 |
| 7,747,941 | B2 | * | 6/2010 | Campbell et al. | 715/234 |
| 7,788,204 | B1 | * | 8/2010 | Thomas | 706/47 |
| 7,802,197 | B2 | * | 9/2010 | Lew et al. | 715/789 |
| 7,805,327 | B1 | * | 9/2010 | Schulz et al. | 705/7.26 |
| 7,827,496 | B2 | * | 11/2010 | Dorn et al. | 715/746 |
| 7,827,615 | B1 | * | 11/2010 | Allababidi et al. | 726/28 |
| 7,840,600 | B1 | * | 11/2010 | Bhatia | 707/793 |
| 7,841,011 | B2 | * | 11/2010 | Manson et al. | 726/28 |
| 7,860,898 | B1 | * | 12/2010 | Moranta et al. | 707/803 |
| 7,870,512 | B2 | * | 1/2011 | Misovski | 715/861 |
| 7,895,519 | B1 | * | 2/2011 | Allegrezza et al. | 715/708 |
| 7,899,903 | B2 | * | 3/2011 | Sanghvi et al. | 709/224 |
| 7,930,476 | B1 | * | 4/2011 | Castelli et al. | 711/114 |
| 2001/0049084 | A1 | | 12/2001 | Mitry | |
| 2002/0174230 | A1 | * | 11/2002 | Gudorf et al. | 709/227 |

(Continued)

*Primary Examiner* — William Bashore
*Assistant Examiner* — Reza Nabi
(74) *Attorney, Agent, or Firm* — Brake Hughes Bellermann LLP

(57) ABSTRACT

Which one of a plurality of customization levels of a customizable operation of a software application is to be provided to a customizing user of the customizable operation may be determined, wherein each of the plurality of customization levels represents a different level of customization abstraction for customizing the customizable operation at an associated level of complexity. A maintenance view including a visual representation of the customizable operation may be provided, the visual representation corresponding to the determined customization level. A customization to the customizable operation may be received and applied to the customization to the customizable operation to cause the software application to implement the customization during an execution thereof.

19 Claims, 6 Drawing Sheets

U.S. PATENT DOCUMENTS

| | | | |
|---|---|---|---|
| 2003/0083947 A1* | 5/2003 | Hoffman et al. | 705/22 |
| 2003/0090515 A1* | 5/2003 | Chang et al. | 345/745 |
| 2003/0109973 A1* | 6/2003 | Hensey et al. | 701/35 |
| 2003/0142139 A1* | 7/2003 | Brown et al. | 345/800 |
| 2004/0165008 A1* | 8/2004 | Levine et al. | 345/789 |
| 2005/0015728 A1* | 1/2005 | Ragan et al. | 715/765 |
| 2005/0044508 A1* | 2/2005 | Stockton | 715/811 |
| 2005/0054381 A1* | 3/2005 | Lee et al. | 455/557 |
| 2005/0120313 A1* | 6/2005 | Rudd et al. | 715/866 |
| 2006/0242638 A1* | 10/2006 | Lew et al. | 717/168 |
| 2007/0157093 A1 | 7/2007 | Karcher | |
| 2007/0243926 A1 | 10/2007 | Cheng | |
| 2008/0005686 A1* | 1/2008 | Singh | 715/764 |
| 2008/0097965 A1* | 4/2008 | Alsafadi | 707/3 |
| 2008/0148150 A1* | 6/2008 | Mall | 715/707 |
| 2008/0168495 A1* | 7/2008 | Roberts et al. | 725/39 |
| 2008/0263462 A1* | 10/2008 | Mayer-Ullmann et al. | 715/762 |
| 2009/0013038 A1* | 1/2009 | Vogler et al. | 709/203 |
| 2009/0044138 A1* | 2/2009 | Rudolph et al. | 715/765 |
| 2009/0311657 A1* | 12/2009 | Dodelson et al. | 434/350 |
| 2009/0327958 A1* | 12/2009 | Lung | 715/810 |
| 2011/0078606 A1* | 3/2011 | Hoff et al. | 715/771 |

* cited by examiner

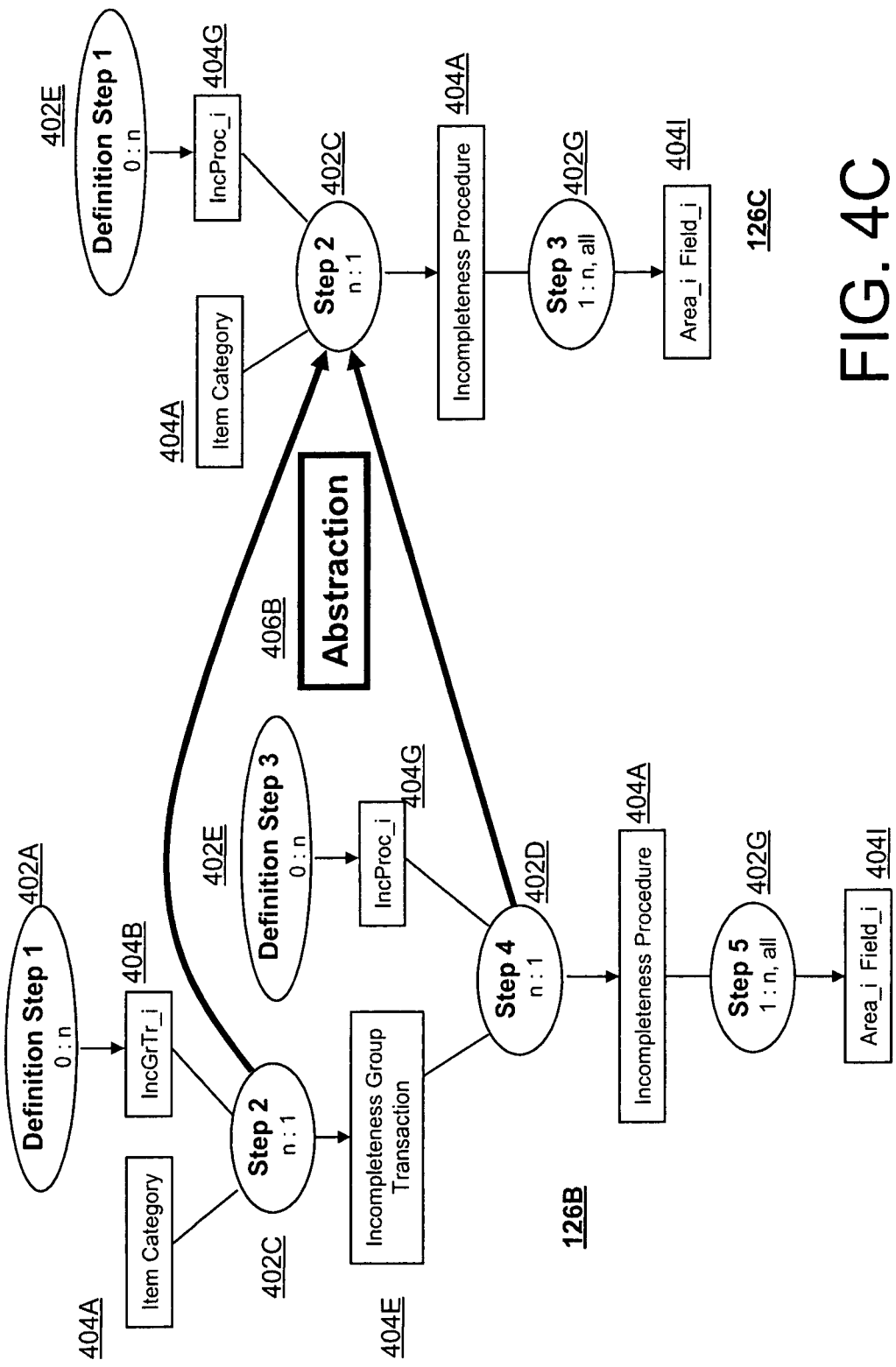

CUSTOMIZATION ABSTRACTION

TECHNICAL FIELD

This description relates to customizing a software application.

BACKGROUND

As different users of an application may have different needs, flexible software packages may be customized to meet the needs of many different users. However, the more a standard software package or application is customized by a particular user, the greater the likelihood that the customizations may result in unexpected output when executed by the software application. The likelihood may be further compounded when new users or users with only basic customization needs are presented with a full range of options, well beyond the scope of their understanding and/or needs. Similarly, more experienced users may prefer to be presented with more and/or deeper customization options than the more basic users. Having only one level of presentation for customization options could create inefficiencies for users of varying experience and/or customization preferences.

SUMMARY

According to an example embodiment, a system is provided. An abstraction engine may be configured to determine which one of a plurality of customization levels of a customizable operation of a software application to provide to a customizing user of the customizable operation, wherein each of the plurality of customization levels represents a different level of customization abstraction for customizing the customizable operation at an associated level of complexity. A view generator may be configured to provide a maintenance view including a visual representation of the customizable operation, the visual representation corresponding to the determined customization level. A customization engine may be configured to receive, via the maintenance view, a customization to the customizable operation and apply the customization to the customizable operation to cause the software application to implement the customization during an execution thereof.

According to an example embodiment, a method is provided. An authorization level of a customizing user of a software application may be determined, the authorization level for determining a level of complexity at which to represent at least one customizable operation of the software application to the customizing user. Which of a plurality of customization levels of the customizable operation correspond to the authorization level may be determined. A visual representation of the customizable operation at the desired level of complexity based on determined customization level may be determined, wherein the determined customization level includes an arrangement of visual icons representing the customizable operation at the desired level of complexity. The visual representation may be provided to the customizing user within a maintenance view, configured to allow for a customization of the customizable operation. The customization to the customizable operation may be received via the maintenance view. The customizable operation may be configured to cause the software application to implement the customization during execution thereof.

According to an example embodiment, a device is provided.

A customization level of customizable operation of a software application corresponding to an authorization level of a customizing user of the software application may be determined, wherein the customization level corresponds to a first visual template for providing a visual representation of the customizable operation at a desired level of complexity. The visual representation may be provided to the customizing user via a maintenance view configured to receive a customization to the customizable operation for implementation with the software application. A toggle of at least a portion of the visual representation may be received, the toggle corresponding to changing the level of complexity to a lesser level of complexity. A second visual template corresponding to the lesser level of complexity may be determined based on the toggle, wherein the second visual template is an abstraction of the first visual template. The visual representation of the customizable operation of the software application may be provided to the customizing user via the maintenance view, the visual representation being based on the second visual template at the lesser level of complexity.

The details of one or more implementations are set forth in the accompanying drawings and the description below. Other features will be apparent from the description and drawings, and from the claims.

BRIEF DESCRIPTION OF THE DRAWINGS

FIG. 4C is an example visual template of a customizable function at a level of abstraction, according to an example embodiment.

DETAILED DESCRIPTION

Figure 1:
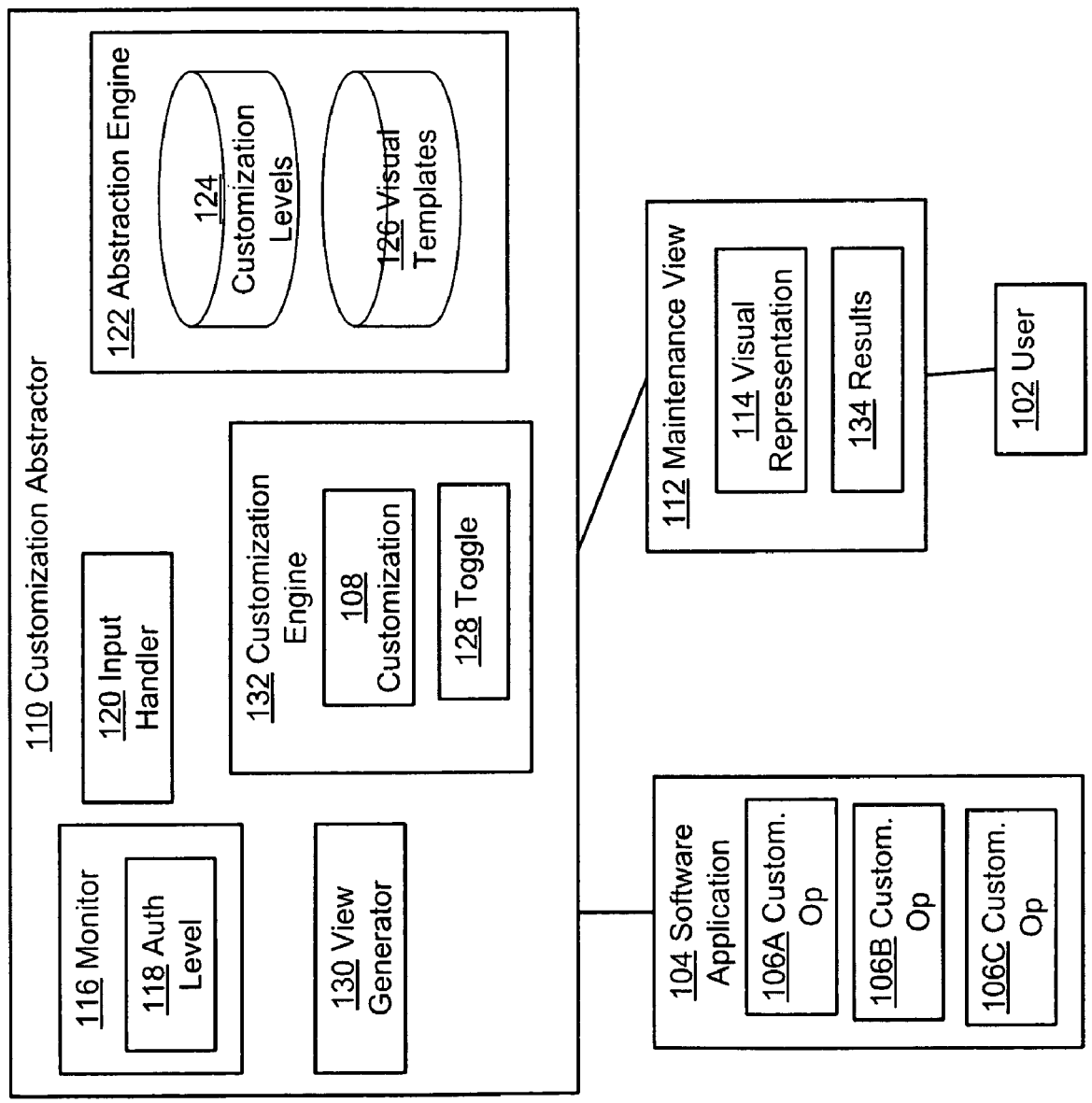
FIG. 1 is a block diagram of an example system for customizing an application at varying levels of abstraction, according to an example embodiment.

FIG. 1 is a block diagram of an example system 100 for customizing an application at varying levels of abstraction, according to an example embodiment. In the example of FIG. 1, the system 100 may allow a user to view and/or customize operations or functions of a software application at any of a number of varying levels of abstraction and/or complexity. The user may expand and contract various abstracted/non-abstracted portions of the customizable operations displayed, and may apply desired customizations to the software application.

For example, the system 100 may allow users of varying levels of familiarity, experience, and/or preferences to view the components or customizable operations of the software application at varying levels of abstraction, based on their needs and/or preferences. A new user to the system 100 may, for example, view the customizable operations at a high level of abstraction, while an experienced or professional user may view the customizable operations at a much lower or no abstraction level (at which more customizable options may be presented). Or for example, an expert user may decide to customize the application at a very high level of abstraction because the user may only have very basic customizations to perform. The system 100 may allow a user to customize the software application, and may also allow the user to customize the way in which the user views and implements the customizations to the software application.

A user 102 may include any user of the system 100. The user 102 may include any person or system that customizes a software application 104. For example, the user 102 may include a consultant, engineer, employee, developer or other user who customizes the software application 104. The user 102 may, for example, get an end-user's or customer's customization requirements, and use the system 100 to apply those customizations to the software application 104. According to an example embodiment, the user 102 may include the person or system that customizes the software application 104, an end-user may include a person or system that uses the customized software application 104, whereby the user 102 and end-user may or may not be one in the same.

The software application 104 may include any software or firmware application with one or more customizable functions or operations 106A-C. According to an example embodiment, the software application 104 may include a customer relationship management (CRM) or enterprise resource planning (ERP) application that includes customizable base functionality that may be customized or otherwise modified to suit a user's needs, including generating reports or other documents as specified by the user. Of course, virtually any other customizable software application is contemplated, as well.

The application 104 may include one or more customizable operations 106A-C. A customizable operation 106A-C may include any functionality or grouping of functionalities performed by the application 104. The customizable operations 106A-C may be customizable to meet a particular client's or other user's needs and/or preferences. A customizable operation 106A-C may include for example, a container, library or other storage, and/or a reference executable code for, one or more processes of the application 104. Then for example, the user 102 may customize one or more of the customizable operations 106A-C to meet a particular set of needs or preferences. Example customizable operations 106A-C may include, but not be limited to, resource management, human resource, tax planning, and sales life cycle functions.

As referenced above, the user 102 may apply one or more customizations 108 to the customizable operations 106A-C of the software application 102. The customizations 108 may include any values or entries provided by the user 102 to customize or modify the customizable operations 106 to meet an end-user's requirements or preferences. For example, the customizations 108 may include an entry as to the location of a data source that a customizable operation 106A accesses to perform a calculation. Or, for example, the customizations 108 may include program code, algorithms or other modifications to one or more of the customizable operations 106A-C.

For example, a customization 108 to a human resource customizable operation 106A designed to provide a roster of employees and consultants working for a client may include providing a location of a server or employee database where such information may be stored and imported into and/or otherwise used or accessed by the application 104. Then for example, during an execution of the human resource operation 106A, the application 104 may retrieve one or more values from the identified database (e.g., customization 108). The customizations 108, however, may include any modifications or customizations to the customizable operations 106A-C and may include, for example, customizations based on a client's industry, operations, size, customer base, capital structure or other attributes or preferences of the client.

The system 100 may include a customization abstractor 110. The customization abstractor 110 may determine various levels of abstraction at which to present or provide the customizable operations 106A-C of the software application 104 to the user 102. For example, upon gauging or receiving a determination as to the user's experience, familiarity and/or customization needs, the customization abstractor 110 may provide to the user 102, via a maintenance view 112, an abstraction of one or more of the customizable operations 106A-C. The user 102 may then toggle, as needed, a visual representation 114 of the customizable operations 106A-C as presented in the maintenance view 112 to change or modify the provided level of abstraction and customize (e.g., via one or more customizations 108) the customizable operations 106A-C of the software application 104.

The maintenance view 112 may include a representation (e.g., visual representation 114) of at least a portion of the customizable operations 106 at varying levels of abstraction (including no abstraction). The maintenance view 112 may allow the user 102 to view the visual representation 114 of the customizable operations 106A-C, including any customizations 108, made therewith and further customize and/or verify the customizable operations 106A-C. According to an example embodiment, the user 102 may cause a subsequent execution of the customized operations 106A-C from the maintenance view 112, for example by pressing a button or selecting a menu item.

The visual representation 114 may include any representation of the customizable operations 106A-C. The visual representation 114 may include visual icons arranged to provide an abstraction of one or more of the customizable operations 106A-C to the user 102. The visual representation 114 at varying levels of abstraction may use varying colors, icons, fonts, arrangements and/or expandable/collapsible portions of the visual representation 114. For example, for a basic user 102, the visual representation 114 may display three functions of the customizable operation 106B, whereby two of the more complex functions may have been combined (e.g., abstracted) into a single visual icon. Then for example, for a more advanced user 102, the visual representation 114 may display all three functions of the customizable operation 106B in full view and/or access of the user 102.

A monitor 116 may determine an authorization level 118 of the user 102. The authorization level 118 may represent or correspond to the experience, familiarity and/or preferences of the user 102. For example, the user 102 may select a desired authorization level 118 when using the system 100. The authorization level 118 may correspond to a desired level of abstraction by which the user 102 may view and/or customize the customizable operations 106A-C. Then for example, the visual representation 114 may display the customizable operations 106A-C at the selected abstraction or complexity level that corresponds to the authorization level 118.

The authorization level 118 may include any determination as to how much complexity or abstraction to provide to the customizing user 102, and may not necessarily be based on permissions the user 102 does or does not have to customize the software application 104. However, according to an example embodiment, the authorization level 118, as determined for the user 102, may preclude the user 102 from accessing certain customizable features of the software application 104.

As just referenced, the monitor 116 may determine the authorization level 118 of the user 102 in any number of ways. For example, the user 102 may provide the desired authorization level 118 to the monitor 116. The monitor 116 may monitor the user's 102 interactions with the system 100 to determine, adjust and/or update the authorization level 118. For example, the monitor 116 may monitor which customizations 108 are made, which parts of the visual representation 114 are expanded/contracted to view more/less of the customizable operations 106A-C and/or a time of use of the system 100.

An input handler 120 may receive input from the user 102. For example, the input handler 120 may receive the authorization level 118 as discussed above and provide this to the monitor 116. Or for example, the input handler 120 may receive a selection of one or more of the customizable operations 106A-C to provide to the user 102, via the visual representation 114 of the maintenance view 112, for customization.

An abstraction engine 122 may determine which one of a plurality of customization levels 124 correspond to the authorization level 118. Each customizable operation 106A-C may include one or more customization levels 124. Each customization level 124 may represent a different level of customization abstraction for customizing the customizable operation 106A-C at an associated level of complexity. For example, the customizable operation 106A may include four customization levels 124 corresponding to varying levels of complexity such as beginner, novice, skilled and expert. Then for example, each customization level 124 of the customizable operation 106A may correspond to one of the authorization levels 118. The abstraction engine 122 may then determine which customization level 124 corresponds to the authorization level 118 and the selected customizable operation 106A.

In an example embodiment, each customizable operation 106A-C may include a different number of customization levels 124. For example, the customizable operation 106A may include four customization levels 124, the customizable operation 106B may include two customization levels 124 and the customizable operation 106C may include three customization levels 124. Then for example, there may be four possible authorization levels 118, level 1, level 2, level 3 and level 4. The abstraction engine 122 may then determine which customization levels 124 of which customizable operations 106A-C correspond to the selected or determined authorization level 118 of the user 102. It may be for example that a level 1 (e.g., authorization level 118) user 102 would not have customization access to the customizable operation 106B, as its two customization levels 124 may only be for level 2, 3 and 4 users 102, whereby level 2 and 3 users are provided the same customization level 124 and level 4 users are provided the more advanced or complex customization level 124.

Each customization level 124 may correspond to one or more visual templates 126. The visual templates 126 may include arrangements of visual icons representing portions of the customizable operations 106A-C at varying levels of abstraction. The visual templates 126 may include a predefined sequence of abstraction based on the level of complexity (e.g., from the most complex to the least complex or vice versa). For example, the customizable operation 106C may include ten visual templates 126 whereby visual template 10 is the most abstract (e.g., least complex) and visual template 1 is the least abstract (e.g., most complex in that more elements, functions or possible customizations 108 are provided). Then for example, the customizable operation 106C may include three customization levels 124, beginning, middle and advanced, associated with the ten visual templates 126. The abstraction engine 122 may then determine, for example, that a user 102 with authorization level 2 (118) corresponds to the middle customization level 124 and should be provided the visual template 5 (114). In other example embodiments different relationships between the authorization level 118, customization levels 124 and visual templates 126 may exist.

According to an example embodiment, the visual templates 126 may include an ordered set of visual templates 126. For example, a first visual template 126 may include all the customizable features of a customizable operation 106A. Then for example, subsequent visual templates 126 may abstract the previous visual template 126 in the order. For example, the second visual template 126 may abstract, contract or truncate the first visual template 126, and the third visual template 126 may abstract the second visual template 126, and so on. Then for example, the system 100 may allow the user 102 to toggle 128 between the various ordered visual templates 126.

The user 102 may then see the selected visual template 126 (e.g., as the visual representation 114) of the customizable operation 106C and may adjust or toggle 128 the visual representation 114 to suit the user's 102 preferences. The toggle 128 may allow the user 102 to adjust the level of abstraction or complexity displayed in the visual representation 114 to suit the user's 102 preferences. For example, the visual representation 114 may include a level 5 visual template 126 which may abstract three functions into one. Then for example, if the user 102 wants access to the three functions that have been abstracted, the user 102 may toggle 128 the abstracted portion of the visual representation 114 to reveal the abstracted functions. A view generator 130 may then provide the user 102 with the next least abstract visual template 126 (e.g., a level four visual template 126) which may include the three previously abstracted functions.

According to an example embodiment, based on the toggle command 128, the monitor 116 may update the authorization level 118. Then next time the user 102 is customizing the customizable operation 106C, the visual template 126 (level 4) may be provided instead of level 5.

The view generator 130 may generate the visual representation 114 of the maintenance view 112. The view generator 130 may provide the selected visual template 126 as the visual representation 114. According to an example embodiment, the maintenance view 112 may appear in an interface, graphical user interface (GUI), or other monitor. Then for example, the view generator 130 may provide the visual representation 114 of the maintenance view 112 for display in the interface.

The user 102 may view the customizable operations 106A-C in the visual representation 114 of the maintenance view 112 and may customize or provide one or more customizations 108 to the customizable operations 106A-C. A customization engine 132 may implement the customization(s) 108. The customization engine 132 may, upon receiving the customization 108, update the corresponding customizable operation(s) 106A-C. The customization engine 132 may apply the customization 108 to the customizable operations 106A-C, such that upon execution (including a simulation thereof) of the software application 104, the customization 108 is implemented and/or executed as well.

According to an example embodiment, the view generator 130 may provide results 134 of an execution of the software application 104 via the maintenance view 112. The results 134 may include intermediate and/or final results, including computations performed therewith, data that has been accessed, and may provide this information to the user 102. Then for example, upon reviewing the results 134, the user 102 may verify and/or update the customizations 108, as necessary, via the maintenance view 112, to get the desired results and/or correct for any unexpected results that may have been generated (e.g., during an execution of the software application 104).

The system 100 may allow a user 102 to view and update or customize customizable operations 106A-C of a software application 104 at varying levels of abstraction. If the user 102 finds that the displayed abstraction level is too abstract (e.g., too simple) or not abstract enough (e.g., too complex), the user 102 may toggle 128 the display to the user's 102 desired preferences. Then for example, based on the customizations 108 and/or toggles 128 performed by the user 102, the authorization level 118 may be updated, and the user 102 may be provided a more customized abstraction level than previously presented.

Figure 2:
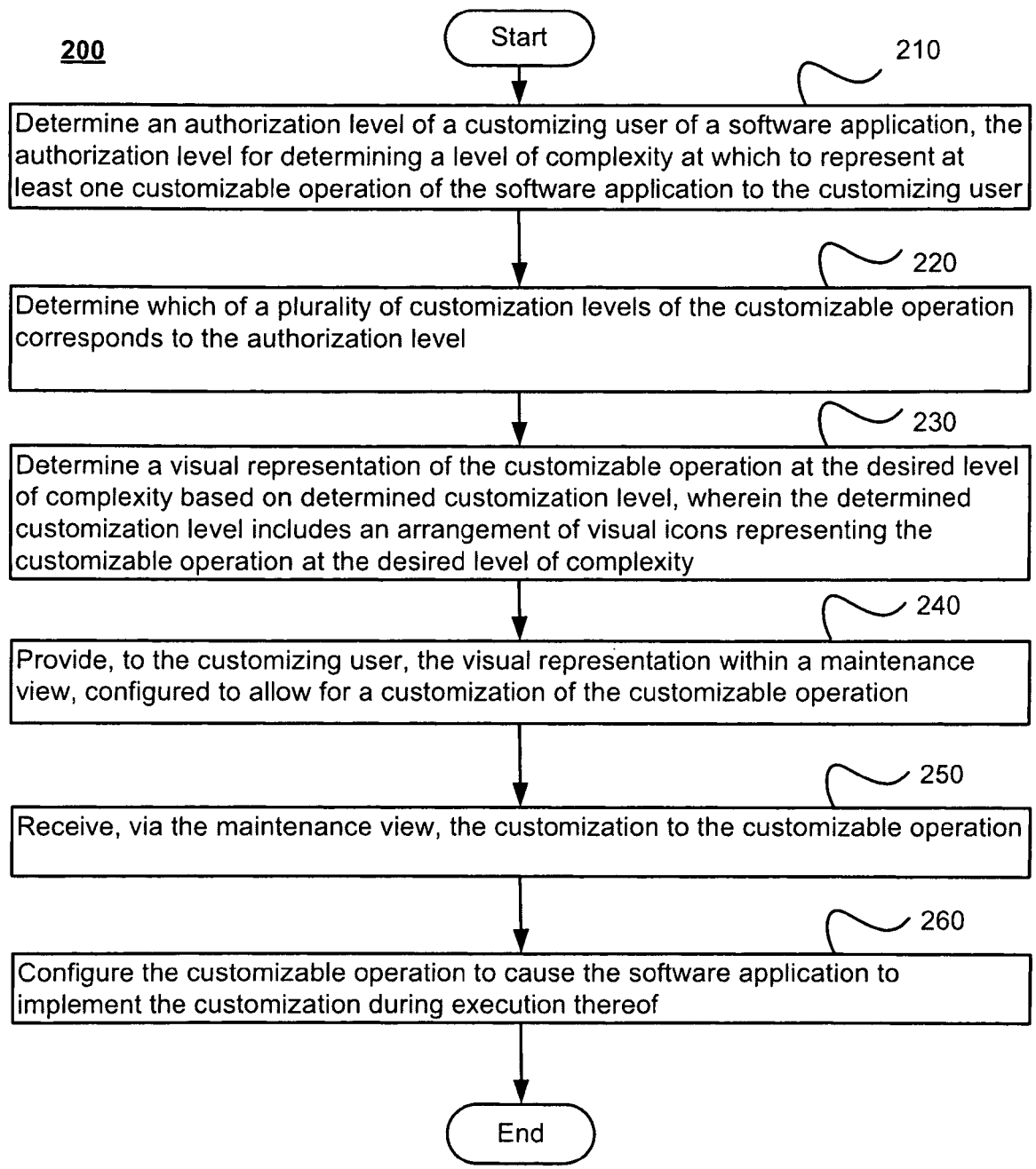
FIG. 2 is a flowchart illustrating example operations of the system of FIG. 1.

FIG. 2 is a flowchart 200 illustrating example operations of the system of FIG. 1. More specifically, FIG. 2 illustrates an operational flow 200 representing example operations related to customizing an application at varying levels of abstraction.

After a start operation, an authorization level of a customizing user of a software application may be determined, the authorization level for determining a level of complexity at which to represent at least one customizable operation of the software application to the customizing user (210). For example, as shown in FIG. 1, the monitor 116 may determine the authorization level 118 of the customizing user 102 of the software application 104. The authorization level 118 may be for determining a level of complexity at which to represent at least on customizable operation 106A-C of the software application 104 to the customizing user 102.

Which of a plurality of customization levels of the customizable operation corresponds to the authorization level may be determined (220). For example, the abstraction engine 122 may determine which of the customization levels 124 of the customizable operations 106A-C correspond to the authorization level 118.

A visual representation of the customizable operation at the desired level of complexity may be determined based on determined customization level, wherein the determined customization level includes an arrangement of visual icons representing the customizable operation at the desired level of complexity (230). For example, the view generator 130 may provide the visual representation 114 of the customizable operations 106A-C at the desired level of complexity based on the determined customization level 124. The abstraction engine 122 may, for example, determine a visual template 126 that corresponds to the customization level, the visual template 126 including an arrangement of visual icons representing the customizable operation 106A-C at the desired level of complexity.

The visual representation may be provided to the customizing user within a maintenance view configured to allow for a customization of the customizable operation (240). For example, the visual representation 114 may be provided to the customizing user 102 within the maintenance view 112 configured to allow for a customization 108 of the customizable operations 106A-C.

The customization to the customizable operation may be received via the maintenance view (250). For example, the input handler 120 may receive the customization 108 and provide it to the customization engine 132.

The customizable operation may be configured to cause the software application to implement the customization during execution thereof (260). For example, the customization engine 132 may configure the customizable operations 106A-C to implement the customization 108 during a subsequent execution of the software application 104.

Figure 3:
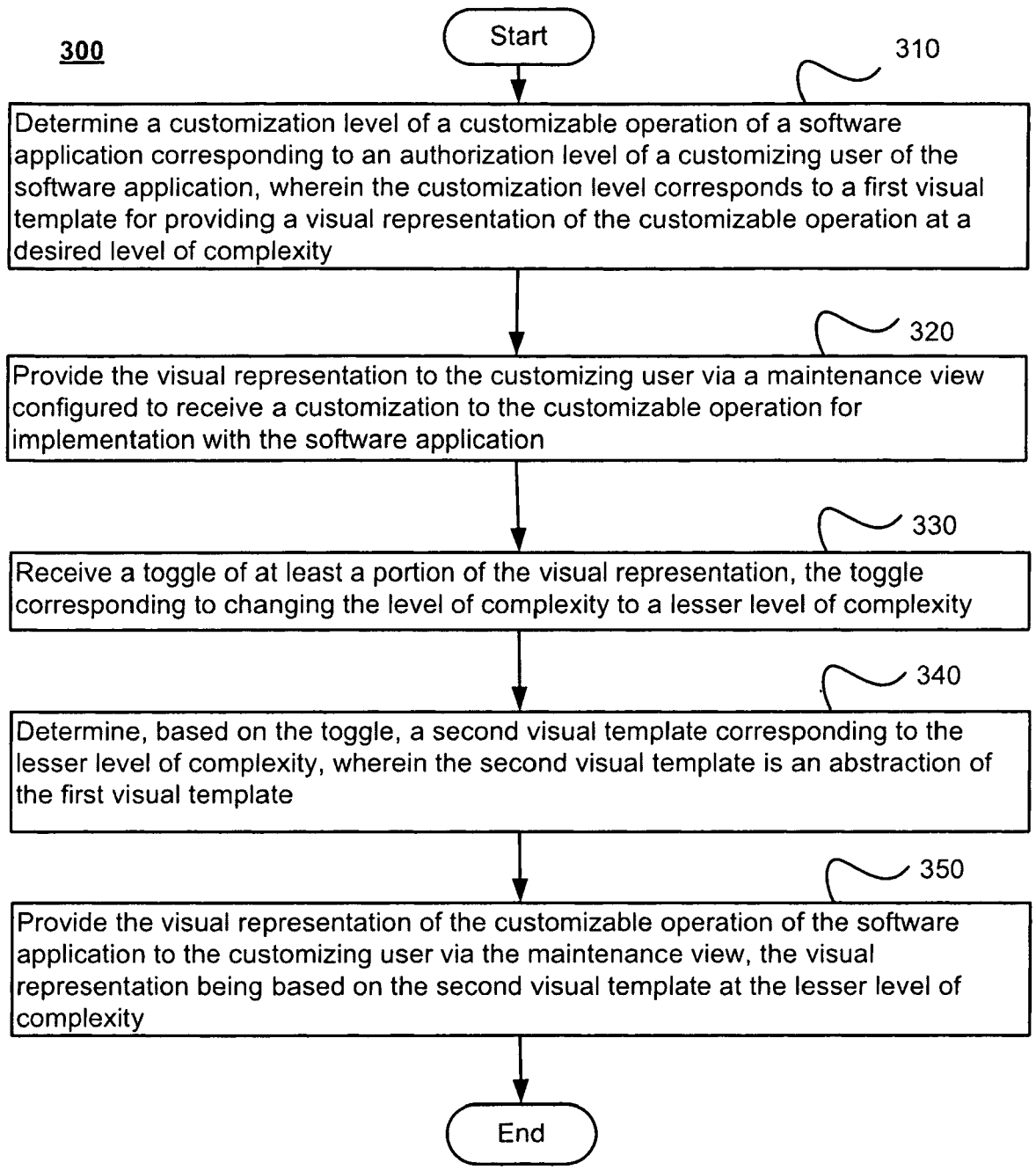
FIG. 3 is a flowchart illustrating example operations of the system of FIG. 1.

FIG. 3 is a flowchart 300 illustrating example operations of the system of FIG. 1. More specifically, FIG. 3 illustrates an operational flow 300 representing example operations related to customizing an application at varying levels of abstraction.

After a start operation, a customization level of a customizable operation of a software application corresponding to an authorization level of a customizing user of the software application may be determined, wherein the customization level corresponds to a first visual template for providing a visual representation of the customizable operation at a desired level of complexity (310). For example, as shown in FIG. 1, the monitor 116 may determine the authorization level 118 of the customizing user 102 of the software application 104. Then for example, the abstraction engine 122 may determine a customization level 124 of a customizable operation 106A-C of the software application 104 that corresponds to the authorization level 118, the customization level 124 corresponding to a visual template 126 for providing the visual representation 114 of the customizable operation 106A-C at a desired level of complexity.

The visual representation may be provided to the customizing user via a maintenance view configured to receive a customization to the customizable operation for implementation with the software application (320). For example, the view generator 130 may provide the visual representation 114 to the customizing user 102 via the maintenance view 112 configured to receive a customization 108 to the customizable operation 106A-C for implementation with the software application 104.

A toggle of at least a portion of the visual representation may be received, the toggle corresponding to changing the level of complexity to a lesser level of complexity (330). For example, the input handler 120 may receive the toggle 128 of at least a portion of the visual representation 114 and may provide the toggle 128 to the customization engine 132 to change the level of complexity to a lesser level of complexity.

A second visual template corresponding to the lesser level of complexity may be determined based on the toggle, wherein the second visual template is an abstraction of the first visual template (340). For example, the abstraction engine 122 may determine a second visual template 126 corresponding to the lesser level of complexity that may be determined based on the toggle 128, wherein the second visual template 126 is an abstraction of the first visual template 126. This may also be seen, as discussed below, in FIGS. 4A-4C.

The visual representation of the customizable operation of the software application may be provided to the customizing user via the maintenance view, the visual representation being based on the second visual template at the lesser level of complexity (350). For example, the view generator 130 may provide the visual representation 114 based on the second visual template 126 at the lesser level of complexity to the customizing user 102 via the maintenance view 112.

Figure 4A:
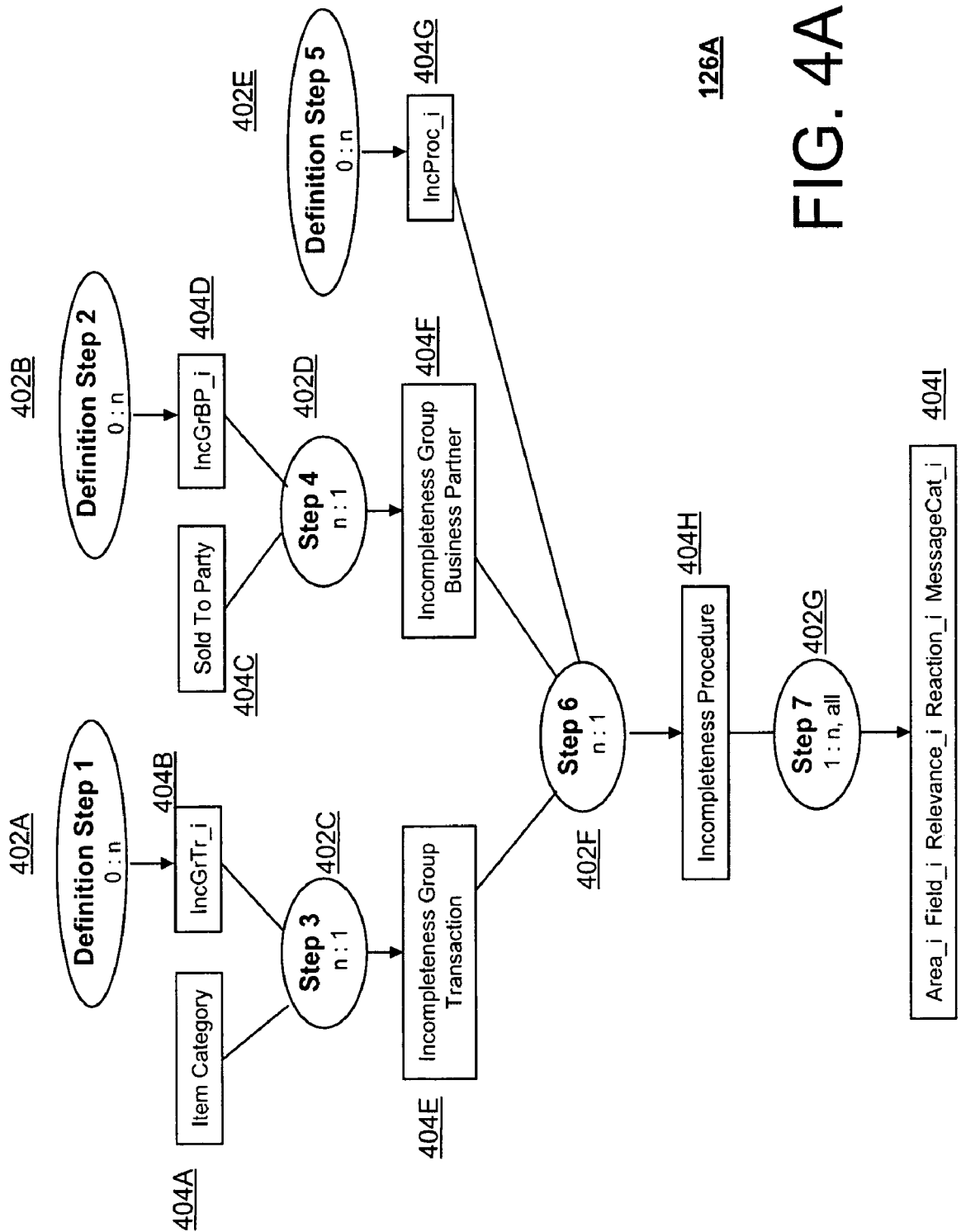
FIG. 4A is an example visual template of a customizable function at a level of abstraction, according to an example embodiment.
Figure 4B:
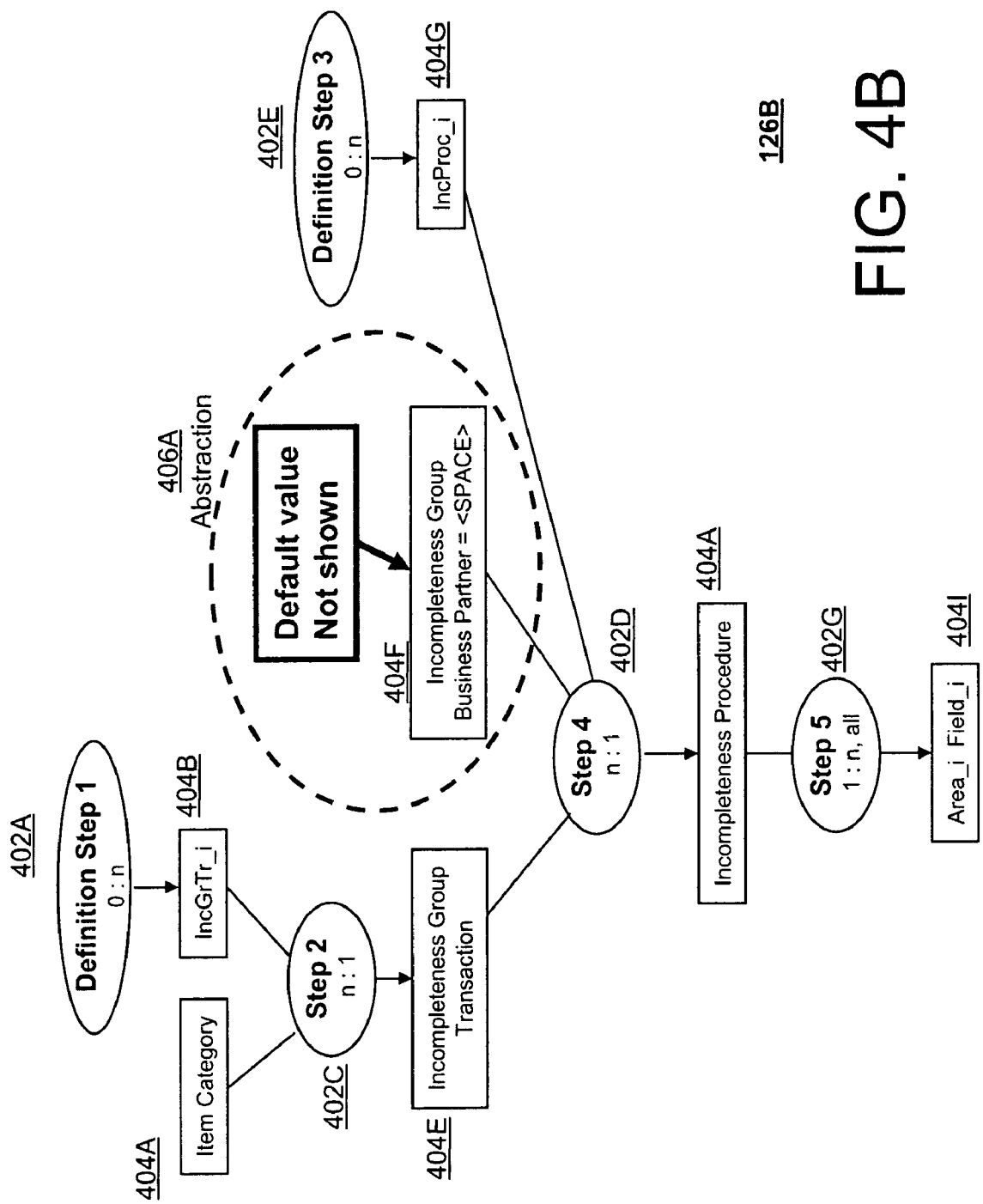
FIG. 4B is an example visual template of a customizable function at a level of abstraction, according to an example embodiment.

FIGS. 4A-4C are example visual templates 126 of a customizable function 106A at varying levels of abstraction, according to an example embodiment. FIG. 4A is an example visual template 126A of a customizable function 106A at a level of abstraction, according to an example embodiment.

In FIG. 4A, the visual template 126A may include visual icons 402A-G representing functional steps performed by the customizable operation, visual icons 404A-I representing data values determined during an execution of the customizable operation and arrows or other indicators indicating the flow of operation. The visual icons 402A-G and 404A-I may include any visual icons that represent one or more portions of the customizable operation, which may or may not be customizable. The visual icons 402A-G, 404A-I may include various shapes, images, text, colors, shading or other varying visual characteristics other than those shown in the exemplary FIGS. 4A-4C. The visual template 126A is shown in a top-down arrangement or design in the example of FIG. 4A, whereby other example embodiments may include other formats or arrangements.

FIG. 4B is an example visual template 126B of a customizable function 106A at a level of abstraction, according to an example embodiment. The visual template 126B may include a more abstract version of the visual template 126A of FIG. 4A. As shown, the visual template 126B may include an abstraction 406A. The abstraction 406A may include any combination, summary or other abstraction of a portion of the customizable function 106A. For example, the abstraction 406A may include a contraction or abstraction of the visual icons 402B, 404C, 404D and 402D (as shown in FIG. 4A) into the visual icon 404F. Then for example, a user 102 may toggle 128 between the visual template 126B for less complexity and the visual template 126A for greater complexity. Also, as shown the visual icon 404I may be abstracted to include fewer items as well.

The abstraction 406A may be based on any number of factors in various embodiments. For example, the abstraction 406A may be determined based on the customizations 108 most often performed by users 102 and/or requested by end-users, it may be determined based on usage by a particular user 102, it may be based on the structure and/or processing of the software application 104, or it may be based on any other relevant factors.

According to an example embodiment, when an abstraction 406A is performed, the system 100 may provide default values for values that may have otherwise been received from the user 102. This may maintain the integrity of the processing performed during an execution of the software application 104, whereby the processing may remain the same, regardless of which visual template 126 is provided to the user 102 for customization.

FIG. 4C is an example visual template 126C of a customizable function 106A at a level of abstraction, according to an example embodiment. The visual template 126C may include a more abstract version of the visual templates 126A and 126B of FIGS. 4A and 4B, respectively. As shown, the visual template 126C may include an abstraction 406B. As shown, the abstraction 406B may include a contraction or abstraction of the visual icons 402C, 404E and 402D of visual template 126B into the visual icon 402C of visual template 126C. Also, the visual icons 402A and 404B may no longer be necessary and removed to simplify the visual template 126C. As may be seen in comparing the visual template 126A with 126C, the arrangement in 126C includes a 7 step customizable operation 126A, whereby the same customizable operation has been abstracted or simplified into the three steps of visual template 126C. As referenced above, the system 100 may provide a user 102 any of the visual templates 126A-C based on the user's authorization level 118, but may also allow the user 102 to toggle between the varying levels of abstraction by which to perform the customizations 108.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system including one or more processors, comprising:
an abstraction engine configured to determine, based on an authorization level of a customizing user, which one of a plurality of customization levels of a customizable operation of a software application to provide, each of the plurality of customization levels representing a different level of complexity;
a view generator configured to provide, during simulation and before customization implementation, a maintenance view including a plurality of visual representations of the customizable operation based on a plurality of visual templates corresponding to the determined customization level, and configured to receive an indicator that a visual template from the plurality of visual templates has been selected based on the plurality of visual representations provided via the maintenance view;
a customization engine configured to implement, in response to the indicator that the visual template from the plurality of templates has been selected via the maintenance view, a customization to the customizable operation corresponding with the determined customization level based on the visual template; and
a monitor configured to receive an indicator of toggling, triggered by the customizing user, between visual templates within the maintenance view and configured to update the authorization level of the customizing user automatically in response to the indicator of the toggling.

2. The system of claim 1, wherein the monitor is configured to determine the authorization level based on a usage of the system by the customizing user.

3. The system of claim 2, wherein:
the view generator is configured to provide the maintenance view including the plurality of visual representations of the customizable operation corresponding with an updated authorization level.

4. The system of claim 1, wherein the abstraction engine is configured to select the customization level from the plurality of customization levels of the customizable operation, the selected customization level corresponds to the authorization level and each customization level corresponds to at least one of a plurality of authorization levels.

5. The system of claim 1, wherein each visual template from the plurality of visual templates includes an arrangement of visual icons representing one or more portions of the software application.

6. The system of claim 1, wherein
the customization engine is configured to receive an indicator that a first portion of the plurality of visual representations has been toggled,
the view generator is configured to provide, in response to the indicator, a second portion of the plurality of visual representations.

7. The system of claim 1, wherein each visual template from the plurality of visual templates includes visual icons corresponding to all customizable features of the customizable operation and that are abstracted based on an ordering of the plurality of visual templates.

8. The system of claim 1 wherein the plurality of visual templates includes at least a first visual template including an arrangement of visual icons of the customizable operation arranged at a first level of complexity, and a second visual template including an abstraction of the first visual template at a second level of complexity that is less complex than the first level of complexity.

9. A method, comprising:
determining an authorization level of a customizing user of a software application, the authorization level being associated with a level of complexity for representing at least one customizable operation of the software application;
determining, based on the authorization level, a customization level from a plurality of customization levels of the customizable operation;
providing, within a maintenance view and during a simulation, a plurality of visual representations of the customizable operation at the level of complexity based on a plurality of visual templates corresponding to the determined customization level, the plurality of visual representations including an arrangement of visual icons representing the customizable operation at the level of complexity, the providing being performed before customization implementation;
receiving an indicator that a visual representation from the plurality of visual representations within the maintenance view has been selected during the simulation;
configuring, in response to the selected visual representation, the customizable operation to cause the software application to implement a customization in the customizable operation during execution of the software application;
receiving an indicator of toggling, triggered by the customizing user, between visual templates within the maintenance view; and
updating the authorization level of the customizing user automatically in response to the indicator of the toggling.

10. The method of claim 9, wherein the determining the authorization level is performed based on one or more customizations performed by the customizing user.

11. The method of claim 9, wherein the plurality of visual templates includes arrangements of at least a portion of the visual icons at varying levels of complexity.

12. The method of claim 9, wherein the determining the authorization level includes receiving the authorization level from the customizing user.

13. The method of claim 9, further comprising:
providing results of the execution of the software application including the customization.

14. The method of claim 13, further comprising:
receiving a further customization to the customizable operation based on the results of the execution; and
configuring the customizable operation to cause the software application to implement the further customization during execution of the software application.

15. The method of claim 9, further comprising:
switching between the determined level of complexity and a new level of complexity;
determining an updated visual representation of the customizable operation at the new level of complexity; and
providing, to the customizing user, the updated visual representation within the maintenance view.

16. The method of claim 9, wherein the customizable operation is a first customizable operation, the method further comprising:
providing, within the maintenance view and based on the visual template, a visual representation of a second customizable operation at the level of complexity based on the determined customization level.

17. The device of claim 9, wherein the visual template is a first visual template, at least one visual icon from the visual icons is formed from a plurality of visual icons from a second visual template.

18. A device including one or more processors, said one or more processors configured to:
- determine an authorization level of a customizing user of a software application, the authorization level being associated with a level of complexity for representing at least one customizable operation of the software application;
- determine, based on the authorization level, a customization level from a plurality of customization levels of the customizable operation;
- provide, within a maintenance view and during a simulation, a plurality of visual representations of the customizable operation at the level of complexity based on a plurality of visual templates corresponding to the determined customization level, the plurality of visual representations including an arrangement of visual icons representing the customizable operation at the level of complexity, the providing being performed before customization implementation;
- receive an indicator that a visual representation from the plurality of visual representations within the maintenance view has been selected during the simulation;
- configure, in response to the selected visual representation, the customizable operation to cause the software application to implement a customization in the customizable operation during execution of the software application;
- receive an indicator of toggling, triggered by the customizing user, between visual templates within the maintenance view; and
- update the authorization level of the customizing user automatically in response to the indicator of the toggling.

19. The device of claim 18, wherein the visual representation is based on a first visual template before the toggling, and is based, after the toggling, on a second visual template that is an abstraction of the first visual template.

* * * * *